Feb. 18, 1947.  J. L. JONES  2,416,089
SELECTIVE PULSE AMPLIFIER SYSTEM
Filed June 26, 1942  2 Sheets-Sheet 1
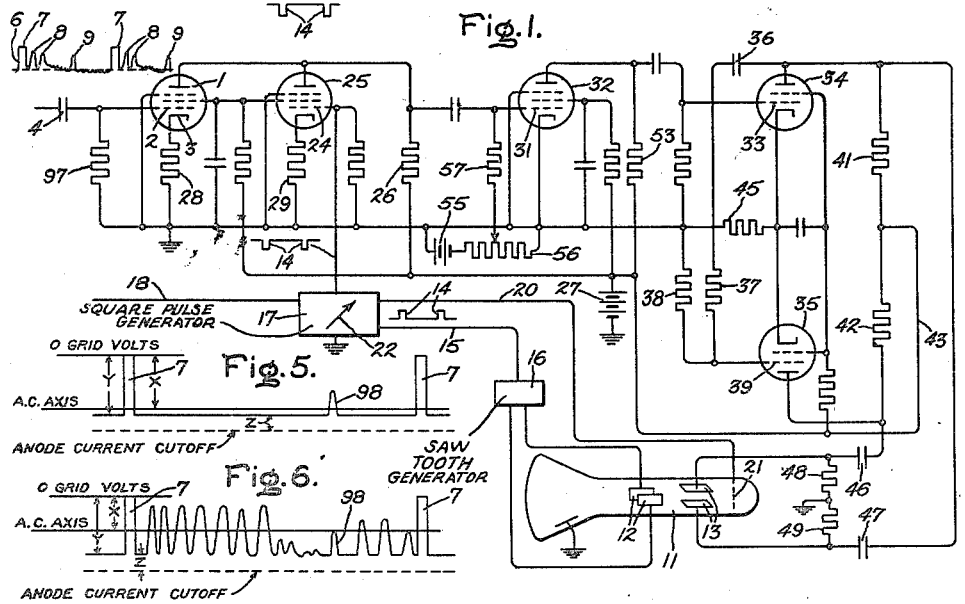
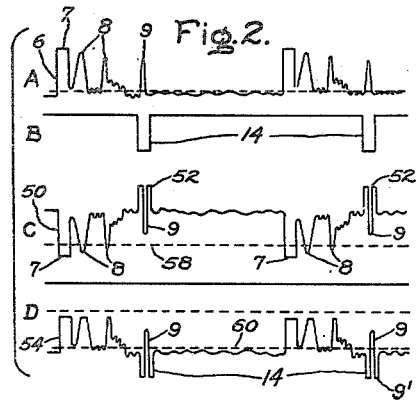
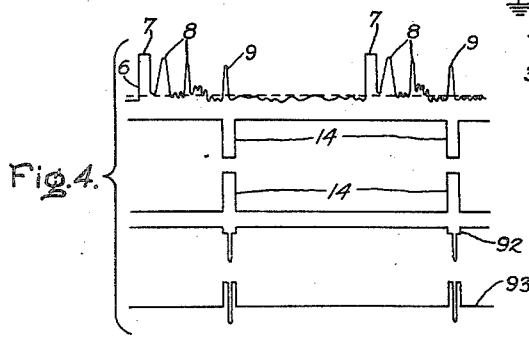
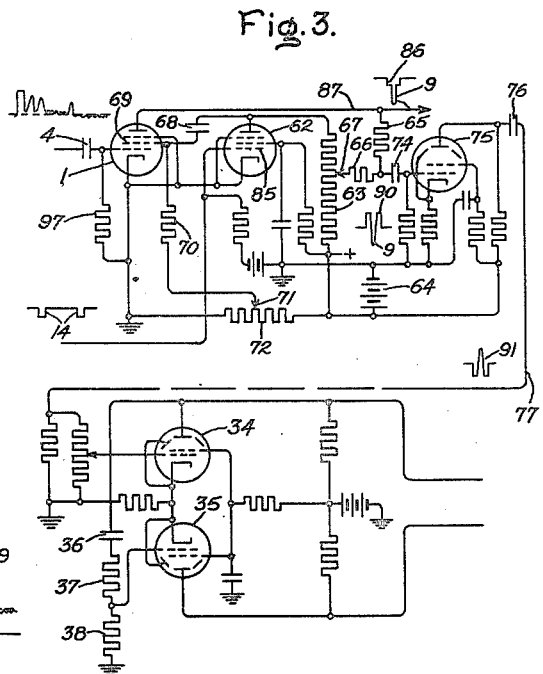
Inventor:
John L. Jones,
by Harry E. Dunham
His Attorney.

Feb. 18, 1947.  J. L. JONES  2,416,089
SELECTIVE PULSE AMPLIFIER SYSTEM
Filed June 26, 1942     2 Sheets-Sheet 2
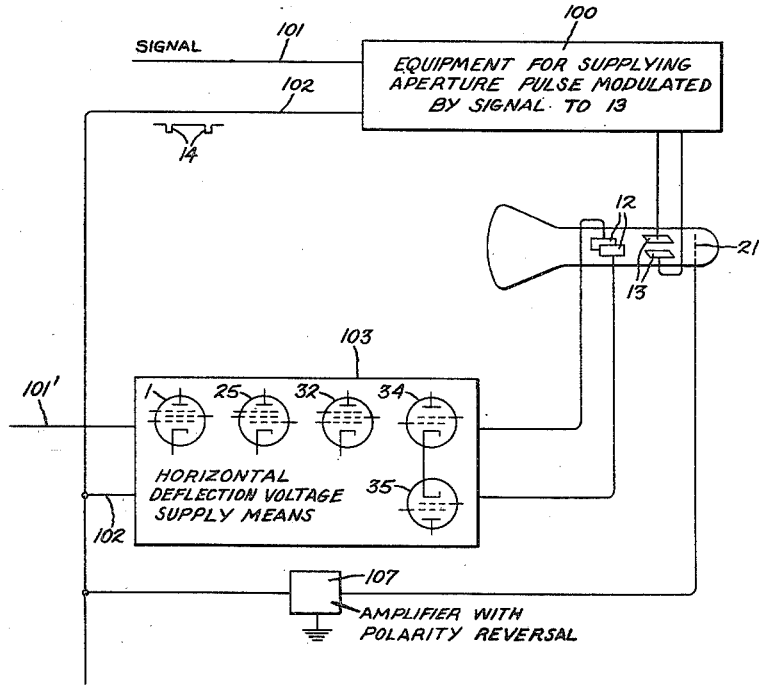
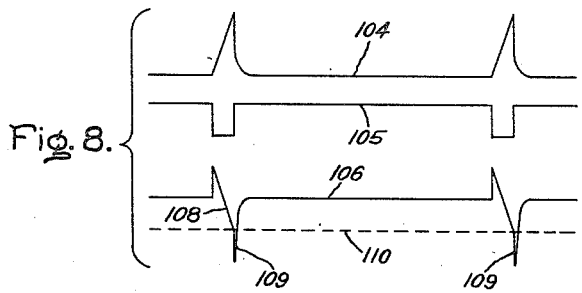
Inventor:
John L. Jones,
by Harry E. Dunham
His Attorney.

Patented Feb. 18, 1947

2,416,089

UNITED STATES PATENT OFFICE 2,416,089

SELECTIVE PULSE AMPLIFIER SYSTEM

John L. Jones, Schenectady, N. Y., assignor to General Electric Company, a corporation of New York Application June 26, 1942, Serial No. 448,538

13 Claims. (Cl. 250—27)

My invention relates to methods and means for effecting amplification of asymmetrical waves such, for example, as may occur in the reception systems of echo apparatus.

In copending application Serial No. 446,231, filed June 8, 1942, by Donald E. Norgaard, entitled Cathode ray apparatus, and assigned to the same assignee as my present invention, is disclosed an echo apparatus in which periodic pulses are radiated and received both directly and by reflection from remote objects. Thus, in the receiver, strong pulses corresponding to the radiated pulses, are received periodically, each such pulse being followed by a train of weaker pulses. These weaker pulses may be due to reflections from remote objects, or due to operation of apparatus on such remote objects. I shall refer to them as trains of echo pulses. Cathode ray apparatus is employed to indicate these received echos.

It is desired, in such apparatus to provide means to produce deflection of the ray of a cathode ray apparatus in accord with a particular one of the pulses of these received trains of pulses. Of course, any single such pulse comprises an extremely asymmetrical alternating current wave and presents some problems relative to its efficient amplification, especially by a push pull amplifier which it is desirable to use to control the deflection of the cathode ray device.

An object of my invention is to provide a novel method and means for effecting amplification of such a pulse.

A further object of my invention is to provide means whereby such a pulse may be more efficiently amplified in a push pull amplifier.

A further object of my invention is to improve the operation of such echo apparatus to indicate a particular one of a train of received echo pulses upon a viewing screen.

The novel features which I believe to be characteristic of my invention may best be understood by reference to the following description taken in connection with the accompanying drawings in which Fig. 1 represents an embodiment of my invention; Fig. 2 represents certain characteristics pertaining to the operation of my invention; Fig. 3 represents a modification thereof; Fig. 4 represents certain characteristics pertaining to the operation of Fig. 3, and Figs. 5 and 6 represent certain characteristics pertaining to the operation of both Figs. 1 and 3; Fig. 7 represents a modification; and Fig. 8 represents certain characteristics pertaining to Fig. 7.

Referring to Fig. 1 of the drawings, I have represented at 1 thereof, an electron discharge device between the control electrode 2 and cathode 3 of which signal potentials are applied, as through a condenser 4. These signal potentials may comprise the signals received in the echo apparatus above referred to. They may comprise successive trains of pulses as indicated at 6, each train comprising a leading strong pulse 7 and subsequent smaller pulses 8 and 9. The pulses 7 may comprise pulses corresponding to the radiated pulses of the echo apparatus and may be received directly from the transmitter. The pulses 8 and 9 may comprise pulses which I shall term as echo pulses and which are produced by reflection of the radiated pulses from remote objects or by operation of apparatus on such remote objects in response to the received radiated pulse.

It is desired that a particular one of these received pulses such as that indicated at 9, be utilized to produce a visible indication upon the viewing screen of a cathode ray device such as that indicated at 11 in the lower portion of Fig. 1. This cathode ray device may be one of any suitable type but is represented as having two pairs 12 and 13 of deflection electrodes, the pair 12 being arranged to deflect the beam in a horizontal direction and the pair 13 being arranged to deflect the beam in the vertical direction.

The horizontal deflection of the beam is produced in regular periodic sequence by means of pulses generated in equipment 17 which may be of square wave type as indicated at 14, and which are supplied over conductor 15 to a saw-tooth generator 16, the latter of which supplies sawtooth voltage of the same frequency between the electrodes 12. These same pulses 14 are also supplied over conductor 20 to the control electrode 21 of the cathode ray device to turn the beam of the cathode ray tube on during the pulses and off during periods between the pulses 14. Thus the beam is turned on and deflected across the entire screen of the cathode ray tube during the period of the pulses of the wave 14 and is extinguished during the retrace interval. These pulses 14 are of very short duration relative to the length of time between radiated pulses and are comparable in length to a radiated pulse. They have the same frequency as the radiated pulse and may be variably phased with respect to the radiated pulses as indicated by the arrow 22; that is, these pulses 14 may be caused to occur simultaneously with the occurrence of any received echo 8 or 9. They determine the brief interval or aperture of time when the apparatus responds to produce an indication in accord with the echo received.

I shall therefore refer to these pulses as aperture pulses. These pulses may be synchronized with the radiated pulses by means of synchronizing pulses transmitted between apparatus 17 and the transmitter in which the radiated pulses are generated over conductor 18. These pulses are supplied in negative sense to control electrode 24 of discharge device 25, the anodes of which are connected together and through a resistance 26 to the positive terminal of a source of operating potential 27, the negative terminal of which is connected to ground and thence to the cathodes of the two devices 1 and 25 through respective cathode bias resistors 28 and 29. Thus the combined wave comprising aperture pulses 14 and the received signal wave train 6, which appears upon the anodes of the two devices 1 and 25, is supplied to the control electrode 31 of a discharge device 32. This device is biased to effect a limiting operation in a manner presently to be described. This device supplies the combined wave, after limiting, to the control electrode 33 of one of the two push pull amplifiers 34 and 35. The anode of discharge device 34 is connected to ground through a capacitor 36 and resistors 37 and 38. The control electrode of the device 35 is connected at a point between the two resistors 37 and 38 whereby it receives a potential in opposed relation to the potential applied to the control electrode 33. The anodes of these two devices 34 and 35 are connected together through equal resistors 41 and 42 and the point between these two resistors is connected through conductor 43 to the positive terminal of the source of anode operating potential 27. The cathodes of devices 34 and 35 are connected to ground through bias resistor 45. The anodes of the two devices are also coupled through capacitors 46 and 47 to the respective deflecting electrodes of the pair 13, the latter of which are each connected to ground through respective resistors 48 and 49.

The operation of the system will now be explained in greater detail by reference to Fig. 2. In Fig. 2 the curve 6 represents the received signal comprising the pulses 7, corresponding to the radiated pulses, and the received echoes 8 and 9. This received signal is applied to the control electrode 2 of the discharge device 1 in positive sense, thereby to produce an increase in anode current, in this discharge device and hence in resistance 26, thereby bringing about a reduction in potential on the anode of this device, in accordance with this wave 6.

The aperture pulses 14 are applied to the control electrode 24 of discharge device 25 in negative sense and thus bring about a reduction in current in the anode of device 25 during the period of these aperture pulses, and hence producing a rise in potential on the anodes of devices 1 and 25 in accordance with these aperture pulses. These aperture pulses are indicated at 14 in Fig. 2 as applied to the control electrode 24 in negative sense.

Curve 50 of Fig. 2 represents the resultant voltage wave appearing upon the anodes of the two devices 1 and 25. It will be seen that this wave is exactly the same as the wave 6 at all times except that the aperture pulses 14 are now present therein and the wave is reversed in polarity with respect to wave 6. Since echo 9 occurs during this aperture pulse it is present in wave 50 as a variation in potential from a different base line 52 from that of echoes 8 by an amount dependent upon the amplitude of the aperture pulse.

This wave 50 is now applied to the control electrode of the device 32 in negative sense whereby it brings about a reduction in current in this device and in resistance 53, thereby producing a rise of potential on the anode of this device 32. Thus the voltage appearing upon the anode of the device 32 may be represented by the curve 54.

The control electrode 31 of this discharge device 32 is biased negatively with respect to the cathode by means of a source of bias potential 55 and a resistance 56, the control electrode 31 being connected to a variable point upon this resistance 56 through a grid resistor 57. The bias potential is so chosen that the peaks of the echoes 8 of the curve 50 and of the pulses 7 of the curve 50 extend below the anode current cut-off point of the grid bias anode current characteristic of the discharge device. This cut-off voltage may be represented by the dotted line 58 of the curve of Fig. 2. Thus these peaks of the pulses 7 and 8 are not reproduced in the curve 54. The wave 54 represents the voltage upon the anode of the discharge device in which the pulses 9 are the pulses to be indicated upon the cathode ray device 11.

The alternating current axis of the wave 54 is indicated by the dotted line 60. It may vary in position in accordance with the intensity of the different echoes but will not vary greatly from the position shown in Fig. 2. However, since only that part of the wave within the aperture pulses 14 is to be indicated upon the viewing screen of the cathode ray device it is desired that that portion of the wave be symmetrical about the alternating current axis. Of course, the intensity of the pulse 9 itself may vary from zero to a value as great as that of the pulses 8. It will be seen, since the pulses 9 occur within the aperture pulses, that when of their maximum amplitude they extend about equally in opposite directions from the zero alternating current axis 60. Thus the discharge devices 34 and 35 may be biased at a point midway of the linear portion of their characteristics, or midway between anode current cut-off and saturation, so that the variation corresponding to pulse 9 produces a variation in voltage extending equally in opposite directions from this bias value. That is, the negative peak 9' of that portion of the wave occurring during the aperture pulses falls at one end of the linear portion of the curve, whereas the positive peak of pulse 9 when of maximum value falls at the other end of that portion of the tube characteristic. In this way the entire range of the linear portion of the grid voltage anode current characteristic of the discharge device is utilized, and the greatest output of the devices is obtained.

The use of push-pull amplifiers operated as herein described is important in my invention since in this way increased peak to peak deflection of the beam of the cathode ray tube is obtained from a given equipment including power supply means and tube complement. At the same time the two deflecting plates are varied in potential equally and oppositely, each symmetrically about an alternating current axis. This avoids the defocusing that would occur if the voltage applied to the deflection plates were obtained from a single ended amplifier.

The amplitudes of variation of the remaining portion of the wave 54 about the alternating current axis may not be symmetrical but this is unimportant since only that portion within the aperture pulse 14 is to be faithfully amplified by the amplifiers 34 and 35, and thereafter utilized by the cathode ray apparatus. Thus the important result is achieved that the portion of the wave to be utilized is applied to the control electrodes of the push-pull amplifiers 34 and 35 as a wave which is symmetrical about an alternating current axis whereby these amplifiers may be most effectively utilized for the amplification of this desired portion of the wave.

Fig. 3 represents a further embodiment of my invention but differs from the embodiment shown in Fig. 1 in that only that portion of the echo train which occurs during the aperture pulse is supplied to the push-pull amplifiers 34 and 35. All other portions of the signal wave train are removed.

In this figure the received signal wave is supplied to the control electrode of discharge device 1 in positive sense as before and the aperture pulses 14 are supplied in negative sense to the control electrode of a discharge device 62. The anode of this discharge device is connected through a resistance 63 to the positive terminal of a source of anode operating potential 64 and the anode of discharge device 1 is connected through resistances 65 and 66 to a variable tap 67 on resistance 63. The anode of discharge device 62 is also coupled through condenser 68 to the screen grid 69 of device 1, the latter of which is connected through resistance 70 to a variable tap 71 on a bleeder resistance 72 connected across the source of anode operating potential 64. The point between resistances 65 and 66 is coupled through condenser 74 to the control electrode of an amplifier 75, the output of which is coupled through condenser 76 and transmission line 77 to the control electrode of one of the two push-pull amplifiers 34. The output of this amplifier is supplied through network 36, 37, and 38 to the input electrode of the other amplifier 35. The output from these amplifiers is supplied to the cathode ray device in balanced relation exactly as shown in Fig. 1.

The aperture pulses 14 are supplied in negative sense to the control electrode 85 of the device 62, thereby reducing the anode current in this device and in resistance 63 and causing an increase in anode potential on this discharge device. This increase in anode potential is supplied through condenser 68 to the screen grid 69 of the discharge device 1. The signal, as previously stated, is supplied to the control electrode of this device 1. This signal is not normally reproduced in the anode circuit because normally the screen grid 69 is either at cathode potential or negative relative thereto. This signal is reproduced only during the period of the aperture pulses when the screen grid 69 is at a positive potential produced thereon by the aperture pulses. Thus the aperture pulses produce a drop in potential across resistance 65 and 66 thereby tending to lower the anode potential on device 1. This drop in potential is increased by the received signal thereby tending to produce a further reduction in anode potential on device 1.

The aperture pulses acting upon device 62 produce a reduction of current in resistance 63 thus tending to increase the potential at point 67 and, of course, tending to increase that between resistances 66, 65, or point 87, and the cathodes. The extent to which these tendencies are effective in producing reduction of potential at point 87, or increase in potential at point 67 is, of course, dependent upon the position of tap 67 on resistance 63 and upon the values of resistances 65 and 66. It is preferred that these resistances be so proportioned, and the position of tap 67 so chosen that the potential of point 87 drops in response to the aperture pulse as indicated at 86, this drop in potential being increased by the signal 9; and so that the potential at the control electrode of device 75 increases in response to the aperture pulse, and drops in response to the signal. Thus the aperture pulse and signal are reproduced on the control electrode of device 75 with the wave form indicated at 90. This latter wave is reproduced in the anode circuit of this device 75 with reversed polarity as indicated at 91 and is thus supplied to the grids of discharge devices 34 and 35 to be reproduced in balanced relation in their anode circuits and hence impressed between the plates of the cathode ray device.

It will be seen that the wave 91 is a symmetrical wave varying substantially equally in the two directions from the average value and thus lends itself to most effective amplification by the devices 34 and 35 for reasons already explained in connection with Fig. 1.

This operation is somewhat better portrayed in Fig. 4 in which the signal wave 6 is indicated in the upper curve of the figure having its received pulses 7, 8, and 9 as previously described. The aperture pulses as applied to the control electrode 85 are represented by the curve 14 as occurring simultaneously with the echo 9. These pulses 14 as they appear upon the screen grid of the device 1 are indicated by the wave 92. The anode potential of this device 91 varies in accordance both with the pulses 14 and with the echo 9 and thus appears upon the anode of this device as indicated by the curve 92. Since device 1 is conducting only during the aperture pulses of the wave 6, all other portions of the signal wave are eliminated from the wave 92. This wave 92 appears on the control grid of device 75 as indicated by the wave 93, this wave being one the variations of which may be substantially symmetrical with respect to a zero alternating current axis. This wave is then, of course, reversed in polarity by the amplifier 75 and supplied to the push-pull amplifier.

In both Figs. 1 and 2 it is desirable that the echo, which occurs during the aperture pulse, and which is utilized to produce a visible indication on the screen of the cathode ray device, produce a variation in potential on the anode of the discharge device from a common base potential irrespective of the character of the received train of pulses, or the intensity of any pulses received other than during the aperture pulse. That is, the base of the echo pulse which occurs during the aperture should be represented by a fixed potential upon the anode of the discharge device irrespective of what may be the character of the received signal during periods between the aperture pulses. This is effected in the system described by rendering the pulses 7 of a constant amplitude by limiting means employed in the receiving channel prior to the equipment illustrated in the drawing, and by the further expedient of producing peak rectification of these pulses 7 upon the grid of discharge device 1. These grids are connected to their associated cathodes through resistance 97, which are proportioned with respect to the capacitance 4 to produce peak rectification of the pulses 7, thereby to yield a bias between the control electrode and cathode of this device 1 equal to the peak-to-peak value of the pulses 7. Then any echo pulse comprises a variation from a value of anode potential fixed by this bias voltage irrespective of the intensity of the different received echo pulses.

This operation is illustrated in Figs. 5 and 6 in which Fig. 5 represents a received signal having pulses 7 of constant amplitude by reason of action of the limiters in the previous portions of the receiving channel and having a single received echo 98. Fig. 6 represents a similar curve having received pulses 7 of the same amplitude and a received echo 98 of the same amplitude as in Fig. 5 but having many other strong received echoes. When the grid of the discharge device 1 becomes positive during the pulse 7, rectification occurs to produce a bias on the resistance 97 equal to the value Y of Figs. 5 and 6, this value of grid voltage at which rectification occurs being of course determined by the static characteristics of the tube itself. Thus the grid is biased negatively by this value Y. The average value of the alternating current wave of Fig. 5 is represented by the horizontal line having the legend "A.-C. axis" in Fig. 5 and this value differs from the value of grid voltage at which rectification occurs and which is represented on the drawing by the legend "Zero grid volts" by the value X. The value Z in Fig. 5 represents the voltage between that value of grid voltage which reduces the anode current to zero and the negative peak of the alternating current wave.

In Fig. 6 it will be seen that the value Y, which is determined by the amplitude of the constant pulses 7 is the same as in Fig. 5. The value X is much reduced but the value Z remains equal to that indicated in Fig. 5. Thus the pulse 98 is reproduced on the anode circuit as a variation from the same fixed value of anode potential in both situations represented by Figs. 5 and 6.

This character of the apparatus as represented by Figs. 5 and 6 is set forth and claimed in copending application Serial No. 446,231 of Donald E. Norgaard, filed June 8, 1942, entitled Cathode ray apparatus, and which is assigned to the same assignee as my present invention.

The form of my invention illustrated in Fig. 3 is more particularly set forth and claimed in copending application Serial No. 445,509 of Franklin M. Deerhake, filed June 1, 1942, entitled Pulse systems, and which is assigned to the same assignee as my present application.

In Fig. 7 I have shown my invention applied not only to the signal channel for controlling the cathode ray device but also to the channel for supplying the time base deflection potential thereto.

In Fig. 7 I have represented at 100 equipment such as that indicated in Fig. 1 or 3 for applying the aperture pulse modulated by the signal to the signal deflection plates 13 of the cathode ray device. The signal may be supplied to the equipment 100 over conductor 101 and aperture pulse may be supplied thereto over conductor 102.

At 103 I have represented equipment likewise similar to that of Figs. 1 and 3 which may apply the horizontal deflection voltages to the horizontal deflection plates 12. This equipment may include for example, discharge device 1, 25, 32, 34, and 35 connected exactly as explained in connection with Fig. 1. In this case however a wave indicated by the curve 104 is supplied to the signal input of the equipment over conductor 101'. The aperture pulse wave is also supplied to this equipment over conductor 102 phased with respect to the wave 104 as indicated by the relation shown in Fig. 8 between curves 104 and 105. These waves 104 and 105 combine in the equipment, exactly as described in connection with Figs. 1 and 3 to produce the symmetrical wave 106 at the input of discharge device 32. This wave may be limited by removing the peaks 109, as indicated by the dotted line 110, amplified by the push-pull amplifiers 34 and 35, and applied to the horizontal deflection plates 12. The aperture pulse is also applied, after being reversed in polarity by amplifier 107 to the control electrode 21 to turn the beam of the cathode ray device on during the steep portion 108 of the wave 106. The ray is deflected across the screen substantially linearly with respect to time during the aperture pulse and is of course reflected at right angles by the received echo.

Thus the push-pull amplifiers may be employed in both deflection channels and in each case they are employed with increased advantage by reason of the fact that the potential applied thereto for amplification is symmetrical with respect to an alternating current axis.

While I have shown particular embodiments of my invention it will, of course, be understood that I do not wish to be limited thereto since various modifications both in the circuit arrangement and in the instrumentalities employed may be made and I contemplate by the appended claims to cover any such modifications as fall within the true spirit and scope of my invention.

What I claim as new and desire to secure by Letters Patent of the United States, is:

1. The method of translating peak portions of an alternating electromotive force in which said peak portions periodically recur in a wave of periodically recurring trains of pulses and are asymmetrical in like sense with respect to the average axis of said wave, which comprises combining with said electromotive force a square wave having the frequency of said trains and having periodic pulses, each of said pulses occurring simultaneously with said peak portion to be translated of one of said trains and having polarity opposite to the deviation of said peak portion from said average axis, and amplifying the resultant wave.

2. In combination, a source of waves having periodic pulses therein, said pulses being asymmetrical in like sense with respect to the alternating current axis of said waves a second source of periodic pulses of the same frequency as said first pulses and occurring simultaneously therewith, means to combine said pulses in such a way as to produce a wave, substantially symmetrical about an alternating current axis during the duration of the pulses from said second source, and means to amplify said symmetrical wave.

3. In combination, an electron discharge amplifier having a grid, an anode, and a cathode, a source of bias potential between said grid and cathode of value to bias said grid to a point substantially midway of the linear portion of the anode current grid voltage characteristic of said amplifier, a source of alternating electromotive force having asymmetrical peaks of like sense to be amplified, means to apply said wave between said grid and cathode, and means to apply between said grid and cathode additional pulses of like sense simultaneously with said peaks to be amplified and of such value and so poled with respect to said peaks that the voltage on said grid varies substantially symmetrically about said bias voltage during said latter pulses.

4. The combination, in a system in which periodic pulses are radiated and received each pulse being followed by a train of echoes thereof, a cathode ray oscillograph, means to deflect the ray of said oscillograph in accord with a selected one of said echoes, said means comprising means to generate periodic pulses of duration longer than that one of said pulses to be selected and short relative to the period between selected pulses and occurring simultaneously therewith, means to deflect said ray across said screen during said pulse, and means to apply said pulse and said train of echoes to said first mentioned deflecting means, said pulse being applied thereto in opposition to said selected echo.

5. In combination, a cathode ray device having a viewing screen, deflecting electrodes, and a control electrode, means normally extinguishing the ray of said device, means to apply a pulse wave to said deflecting electrodes having a periodic asymmetrical peak to be indicated by said device, means to apply an additional square wave pulse to said electrodes in opposition to said asymmetrical peak and of duration sufficient to embrace said asymmetrical peak and of amplitude to produce substantially equal and opposite variations during said pulse from the average value of said pulse wave, and means to apply said square wave pulse to said control electrode poled to turn the cathode ray of said device on during said square wave pulse.

6. In combination, a cathode ray device having a viewing screen and deflecting electrodes, means normally extinguishing the ray of said device, means to apply a pulse wave to said deflecting electrodes having periodic peaks to be indicated by said device, said peaks being asymmetrical in like sense, and means to apply additional periodic square wave pulses of like sense to said electrodes in opposition to said asymmetrical peak and of duration sufficient to embrace said asymmetrical peak and of amplitude to produce substantially equal and opposite variations during said pulse from the average value of said pulse wave.

7. In combination, an electron discharge amplifier having a grid, an anode, and a cathode, a source of bias potential between said grid and cathode of value to bias said grid to a point substantially midway of the linear portion of the anode current grid voltage characteristic of said amplifier, a source of alternating electromotive force having periodic trains of asymmetrical peaks of like sense, certain of which peaks are to be amplified, said peaks being of variable intensity, means to apply said wave between said grid and cathode, and means to apply between said grid and cathode additional periodic pulses simultaneously with said certain peaks to be amplified and of such value and so poled with respect to said peaks that the voltage on said grid during said certain peaks varies substantially symmetrically about said bias voltage during said latter pulses when said peaks are of maximum intensity.

8. In combination, an electron discharge amplifier having a grid, an anode, and a cathode, a source of bias potential between said grid and cathode of value to bias said grid to a point substantially midway of anode current cut-off and anode current saturation, a source of alternating electromotive force having different periodically recurring peaks including one periodically recurring peak to be amplified, said peaks extending in the same direction asymmetrically from the zero axis of said electromotive force, means to combine with said wave a square wave periodic pulse poled oppositely to said peaks and occurring simultaneously with said one periodically recurring peak and of intensity substantially equal to half the maximum intensity of said one periodically recurring peak, means to limit the other of said peaks to a value not exceeded by said one peak, and means to apply the resulting wave between said grid and cathode.

9. The method of amplifying periodically recurring portions of an asymmetrical wave of alternating electromotive force having periodically recurring peaks which extend from a common base level across the average alternating current axis of said wave, which method comprises the step of combining with said wave periodically recurring pulses of the duration of said recurring portions and of short duration relative to the period of recurrence thereof and having polarity opposite the peaks occurring during said portions and having intensity such that said peaks of maximum intensity extend equally and oppositely from said average axis.

10. In a pulse amplification system in which periodically recurring peaks are to be amplified in a wave having periodically recurring trains of peaks, the method which comprises generating a square wave having the frequency of said trains and having pulses of one polarity of duration greater than the duration of the peaks to be amplified and shorter than the period of said trains, combining said waves in such relation that said pulses of one polarity oppose said peaks to be amplified, and amplifying the resulting wave.

11. The combination of means to produce an asymmetrical pulse wave having periodically recurring peaks, said peaks extending from a common base level across the average axis of said wave, means to produce a square wave having the frequency of said periodically recurring peaks and having pulses of one polarity of duration greater than certain of said peaks and less than the period between recurring peaks and pulses of the opposite polarity extending over the remainder of said wave, means to combine said square wave and asymmetrical pulse wave in such relation that said pulses of one polarity occur simultaneously with said certain peaks and in sense opposite thereto whereby the base level of said certain peaks is removed from said average axis and said pulses of one polarity having intensity such that when said certain peaks are of maximum intensity they extend substantially equally on opposite sides of said average axis, and means to amplify said certain peaks.

12. In combination, means producing a pulse wave comprising periodically recurring series of peaks all extending in the same direction from a common base level, means to produce a square wave having the frequency of said recurring series, and having pulses of one polarity short relative to the duration of pulses of the opposite polarity, means to combine said square wave with said pulse wave in such relation that selected peaks in each of said series occur during said pulses of one polarity and are of opposite sense with respect thereto, said pulse of one polarity being of such intensity that the resultant wave during said pulses of one polarity extends equally on opposite sides of an average axis when said peaks are maximum, and means to amplify said selected peaks.

13. The combination, in an echo apparatus in which periodically recurring series of pulses are received and translated to corresponding pulses of unidirectional potential extending in the same direction from a common base level, of a cathode ray device having a viewing screen, means to indicate on said screen only selected pulses in each of said series, said means comprising means to generate a square wave having the frequency of recurrence of said series of pulses and having a pulse of one polarity of duration equal to the interval over which said selected pulses may occur, means to combine said square wave with said pulses of unidirectional potential in such relation that said pulse of one polarity oppose said selected pulses to produce a resultant having peaks extending equally on opposite sides of an average axis, means to deflect said ray in one direction during said pulses of one polarity and to interrupt said ray between said pulses, and means to deflect said ray in a different direction in accord with said resultant.

JOHN L. JONES.

REFERENCES CITED

The following references are of record in the file of this patent:

UNITED STATES PATENTS

| Number | Name | Date |
| --- | --- | --- |
| 2,203,004 | West | June 4, 1940 |
| 2,208,422 | Hugon | July 16, 1940 |